(12) United States Patent
Panda et al.

(10) Patent No.: US 9,135,307 B1
(45) Date of Patent: Sep. 15, 2015

(54) SELECTIVELY GENERATING ALTERNATIVE QUERIES

(71) Applicants: Navneet Panda, Mountain View, CA (US); April R. Lehman, Mountain View, CA (US); Trystan G. Upstill, Palo Alto, CA (US)

(72) Inventors: Navneet Panda, Mountain View, CA (US); April R. Lehman, Mountain View, CA (US); Trystan G. Upstill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/728,851

(22) Filed: Dec. 27, 2012

(51) Int. Cl.
G06F 17/30 (2006.01)

(52) U.S. Cl.
CPC .................................. G06F 17/3053 (2013.01)

(58) Field of Classification Search
CPC ................................ G06F 17/30; G06F 17/00
See application file for complete search history.

(56) References Cited

U.S. PATENT DOCUMENTS

| | | | | |
|---|---|---|---|---|
| 7,599,938 B1 * | 10/2009 | Harrison, Jr. | ................. | 705/7.29 |
| 7,809,709 B1 * | 10/2010 | Harrison, Jr. | ................. | 707/707 |
| 7,870,147 B2 * | 1/2011 | Bailey et al. | ................. | 707/767 |
| 8,065,299 B2 * | 11/2011 | Curtis et al. | ................. | 707/727 |
| 8,065,316 B1 * | 11/2011 | Baker et al. | ................. | 707/768 |
| 8,359,326 B1 * | 1/2013 | Garg et al. | ................. | 707/767 |
| 8,396,865 B1 * | 3/2013 | Ie et al. | ................. | 707/723 |
| 8,504,437 B1 * | 8/2013 | Agarwal et al. | ................. | 705/26.3 |
| 8,661,051 B1 * | 2/2014 | Garg et al. | ................. | 707/767 |
| 8,700,653 B2 * | 4/2014 | Hansson et al. | ................. | 707/767 |
| 8,706,750 B2 * | 4/2014 | Hansson et al. | ................. | 707/767 |
| 8,719,176 B1 * | 5/2014 | Harrison, Jr. | ................. | 705/319 |
| 8,725,756 B1 * | 5/2014 | Garg et al. | ................. | 707/767 |
| 8,751,470 B1 * | 6/2014 | Garg et al. | ................. | 707/705 |
| 2004/0215607 A1 | 10/2004 | Travis, Jr. | | |
| 2005/0182663 A1 * | 8/2005 | Abraham-Fuchs et al. | ...... | 705/3 |
| 2006/0224554 A1 * | 10/2006 | Bailey et al. | ................. | 707/1 |
| 2007/0239698 A1 * | 10/2007 | Quinn-Jacobs | ................. | 707/4 |
| 2007/0244900 A1 * | 10/2007 | Hopkins et al. | ................. | 707/10 |
| 2009/0100381 A1 * | 4/2009 | McAfee et al. | ................. | 715/855 |
| 2011/0060736 A1 * | 3/2011 | Bailey et al. | ................. | 707/727 |
| 2011/0179005 A1 * | 7/2011 | Wang et al. | ................. | 707/706 |
| 2011/0252016 A1 * | 10/2011 | Shacham et al. | ................. | 707/706 |
| 2012/0047025 A1 * | 2/2012 | Strohman | ................. | 705/14.71 |
| 2012/0047134 A1 * | 2/2012 | Hansson et al. | ................. | 707/731 |
| 2012/0047135 A1 * | 2/2012 | Hansson et al. | ................. | 707/731 |
| 2013/0086509 A1 * | 4/2013 | Satyanarayana et al. | ..... | 715/781 |
| 2014/0181135 A1 * | 6/2014 | Hansson et al. | ................. | 707/767 |

OTHER PUBLICATIONS

Kelly, Diane. "Developing and Evaluating a Query Recommendation Feature to Assist Users with Online Information Seeking and Retrieval." (2011).*

(Continued)

*Primary Examiner* — Farhan Syed
(74) *Attorney, Agent, or Firm* — Fish & Richardson P.C.

(57) ABSTRACT

Methods, systems, and apparatus, including computer programs encoded on computer storage media, for obtaining search results from high-quality sites. One of the methods includes receiving data identifying first resources that are responsive to a first query. If at least a first threshold number N of top-ranked first resources are located on sites previously identified as low quality sites, a second query and data identifying second resources that are responsive to the second query are obtained, wherein at least a second threshold number M of top-ranked second resources are located on sites previously identified as being high-quality sites. Search results are provided in response to the first query, wherein the search results identify one or more of the first resources and also identify a particular second resource of the second resources.

18 Claims, 4 Drawing Sheets

(56) References Cited

OTHER PUBLICATIONS

Ambite, José L., and Craig A. Knoblock. Planning by Rewriting: Efficiently Generating High-Quality Plans. No. ISI/RR-97-454. University of Southern California Marina Del Rey Information Sciences Inst, 1997.*

Zhuang, Ziming. "Mining feedback in ranking and recommendation systems." PhD diss., The Pennsylvania State University, 2009.*

* cited by examiner

SELECTIVELY GENERATING ALTERNATIVE QUERIES

BACKGROUND

This specification relates to selectively augmenting Internet search results with search results from sites identified as high-quality sites.

The Internet provides access to a wide variety of online resources, including video or audio files, web pages for particular topics, maps, and news articles. A search system can identify resources in response to a query that includes one or more search terms or phrases. The search system ranks the resources based on their relevance to the query and on measures of quality of the resources, and provides search results that include links to the identified resources. The search results are typically ordered for viewing according to their respective rank.

SUMMARY

This specification describes a system that can modify a first set of search results identified in response to a query when the first set of search results identify at least a threshold number of resources that are located on low-quality sites. The system can then use an alternative query to identify a second set of search results that identify resources located on high-quality sites. The system can then merge the first set of resources and all or a portion of the resources in the second set of resources in such a way that top-ranked resources in the set of merged resources include one or more resources located on high-quality sites.

In general, one innovative aspect of the subject matter described in this specification can be embodied in methods that include the actions of receiving a first query; receiving, from a search engine, data identifying first resources that are responsive to the first query, wherein each of the first resources has a respective ranking score; determining that at least a first threshold number N of top-ranked first resources are located on sites previously identified as low-quality sites; in response to determining that at least a first threshold number N of top-ranked first resources are located on sites previously identified as low-quality sites, obtaining a second query, wherein the second query is an alternative to the first query; receiving, from the search engine, data identifying second resources that are responsive to the second query, wherein each of the second resources has a respective ranking score and wherein at least a second threshold number M of top-ranked second resources are located on sites previously identified as being high-quality sites; and providing search results in response to the first query, wherein the search results identify one or more of the first resources and also identify a particular second resource of the second resources, wherein the particular second resource is located on a previously-identified high-quality site, and wherein the particular second resource is not among the one or more of the first resources. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Obtaining the second query comprises identifying a particular query and M top-ranked second resources that are responsive to the particular query and that have at least a third threshold number of second resources in common with the N top-ranked first resources. The actions include determining that in a mapping of queries to alternative queries, the first query is mapped to the second query. The number N of top-ranked first resources is equal to the number M of top-ranked second resources. The actions include selecting the particular one of the second resources from one or more resources located on high-quality sites of the M top-ranked second resources. The actions include determining that the top-ranked resource in the second resources is located on a high-quality site; and selecting the top-ranked resource in the second resources as the particular one of the second resources. Providing search results comprises determining a scaling factor, wherein the scaling factor is a function of a first ranking score associated with a top-ranked resource in the first resources and a second ranking score associated with the particular one of the second resources; computing a scaled ranking score associated with the particular second resource by multiplying an initial ranking score associated with the particular second resource by the scaling factor; and ranking the search results and a search result corresponding to the particular second resource based on the ranking scores associated with the one or more first resources and the scaled ranking score associated with the particular second resource. The scaling factor is given by $(R_1+1)/R_2$, wherein $R_1$ represents a first ranking score for a top-ranked resource of the first resources and $R_2$ represents a second ranking score for a top-ranked resources of the second resources.

In general, another innovative aspect of the subject matter described in this specification can be embodied in methods that include the actions of receiving data identifying first resources, wherein the first resources are resources that are responsive to a first query; determining that at least a first threshold number N of top-ranked first resources are located on sites previously identified as low-quality sites; determining that a second query is an alternative query, wherein determining that the second query is an alternative query comprises receiving data identifying second resources, wherein the second resources are resources that are responsive to the second query; determining that at least a second threshold number M of top-ranked second resources are located on sites previously identified as being high-quality sites; and determining that the second resources include at least a third threshold number X of the M top-ranked second resources also occur in the N top-ranked first resources; and generating a mapping between the first query and the second query. The foregoing and other embodiments can each optionally include one or more of the following features, alone or in combination. The first query and the second query include at least one common query term.

Particular embodiments of the subject matter described in this specification can be implemented so as to realize one or more of the following advantages. Top-ranked search results will include search results that include links or references to resources located on high-quality sites. In addition, a user's experience can be improved because the user can receive search results that better satisfy the user's query.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
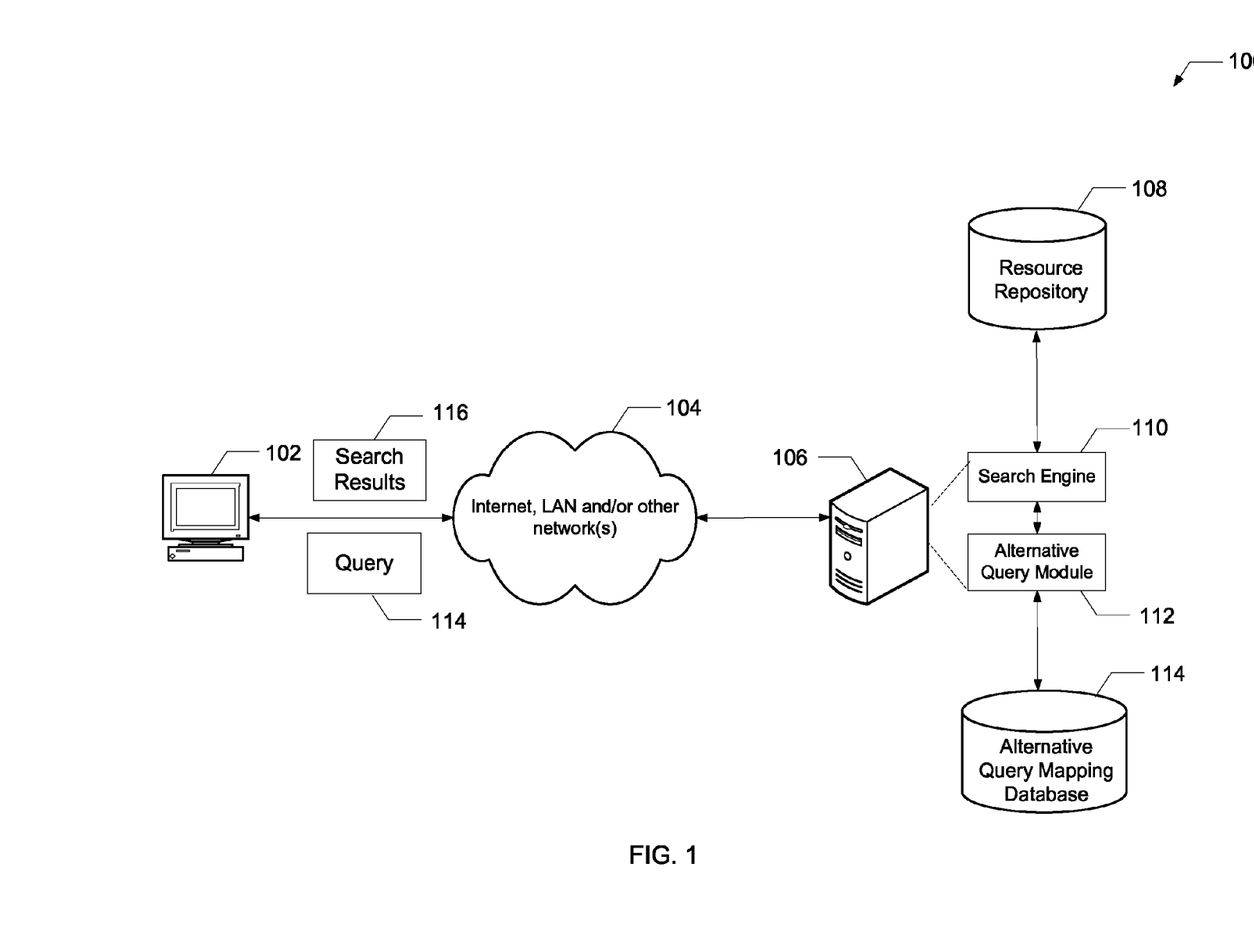
FIG. 1 is a block diagram of an example system for identifying an alternative query.

FIG. 1 is a block diagram of an example system 100 for identifying an alternative query. The example system 100 includes a user device 102, a network 104 and a search system 106.

In general, the search system 106 receives a query 114 from the user device 102 over the network 104. In response, the search system identifies search results 116 that satisfy the query 114 and transmits the search results 116 over the network 104 to the user device 102.

The user device 102 can be any appropriate type of data processing apparatus that can access or interact with the search system 106 through the network 104. For example, the user device 102 can be a laptop, a personal computer, a server, a network accessible phone, or a tablet computer. The user device 102 can include various software applications that can be executed by the user device 102. For example, the user device 102 can execute a web browser or program that allows the user of the user device 102 to interact with the search system 106, e.g. by rendering a presentation of the search results 116 on a search results page.

A query is a request for information, and can be received in various forms, including one more query terms, an image file, an image representation, a specification of an image location, audio, or other forms. A query can be received from a user, or a query can be automatically generated by the search system 106. For example, a user of the user device 102 can enter terms of the query into a text input field of a search engine user interface.

A search result, sometimes referred to as a "result," provided by a search engine in response to the query 114 includes an Internet address, e.g., a Uniform Resource Identifier (URI), of a resource that the search engine determines to be responsive to the query, e.g., a web page, blog, a video or audio file, a map, product information, user information, a news article, and so on. Each resource can be located on or otherwise associated with a site, which is described below. A search result can include other items, e.g., a title, preview image, user rating, map or directions, description of the corresponding resource, or snippet of text that has been automatically or manually extracted from, or otherwise associated with, the corresponding resource.

The network 104 can be any appropriate type of communication network, e.g., a local area network (LAN), wide area network (WAN), the Internet, or a combination of them.

The search system 106 can be one or more computers or servers configured to receive queries from the user device 102 and provide search results to the user device 102. The search system 106 can include a resource repository 108, a search engine 110, an alternative query module 112, and an alternative query mapping database 114.

In response to receiving a query 114, the search system 106 identifies one or more resources that satisfy the query 114 and generates a respective search result for each of the identified resources, e.g. using search engine 110. The search system 106 may identify more resources than the number of search results the system than the system is configured to provide to the user device 102, at a time. Thus, it may be that only a portion of the resources can be identified in a search engine results page from the search system 106. The user device 102 can display the search engine results page in a web browser or other application. The search engine can present the search results in a ranked order. The ranked order of search results can be based on respective ranking scores associated with the resources. The ranking score associated with a particular search result can be based on various factors, for example, a score for the title or name of the resource, a category associated with the resource, a site quality score based on the site associated with the resource, and so on.

The resource repository 108 can be any type of database or memory system. The resource repository 108 includes copies of online resources. In addition, the resource repository 108 can include indexes storing data about the online resources. The search engine 110 can access the resource repository 108.

The search system 106 can include or interact with an alternative query module 112 to identify an alternative query.

Figure 3:
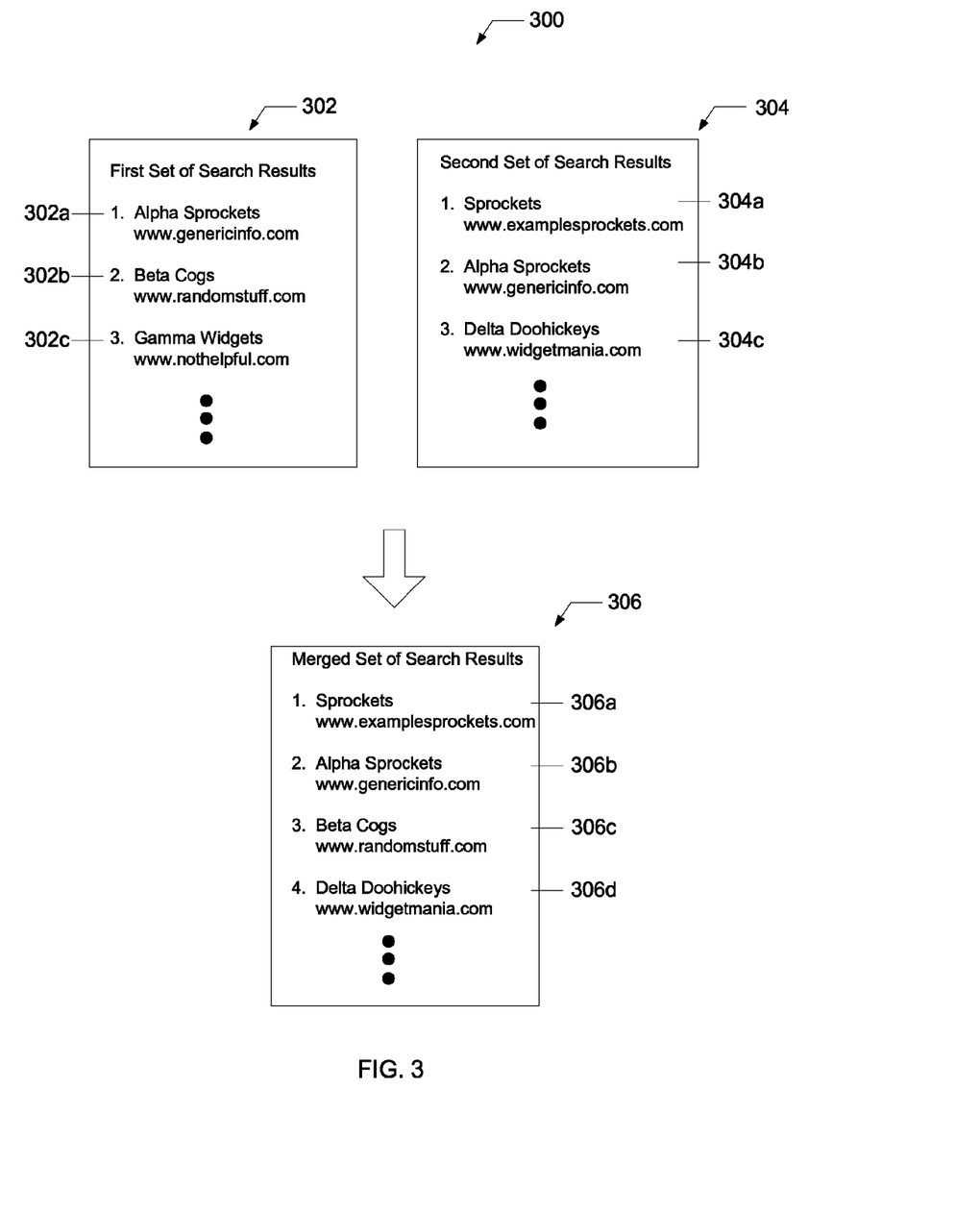
FIG. 3 illustrates examples of search results.

The alternative query mapping database 114 can be any appropriate collection of data that stores mappings of queries to alternative queries. An example process 300 to generate the alternative query mapping database 114 is illustrated in FIG. 3 and is described below.

In some implementations, the alternative query module 112 computes a hash value for a query and uses the hash value as an index into a conventional hash table to identify the alternative query that corresponds to the received query.

Figure 2:
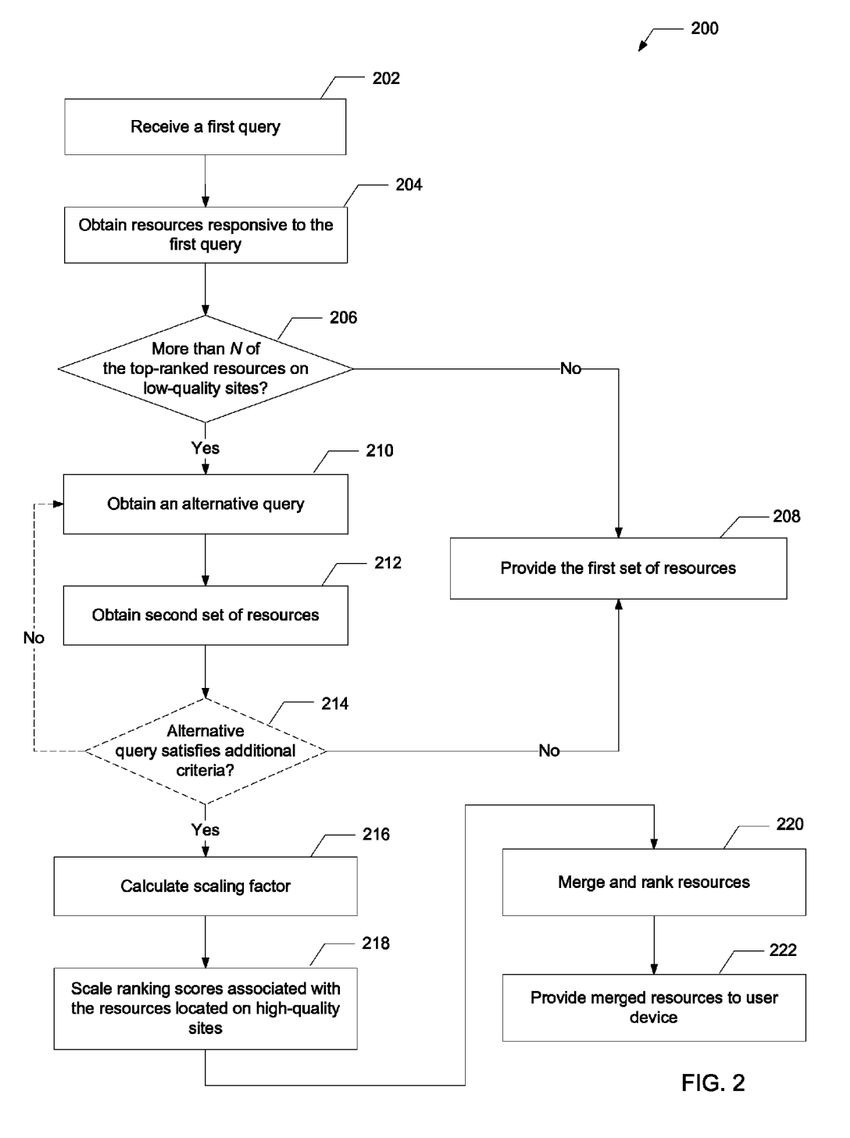
FIG. 2 is a flowchart of an example process for identifying an alternative query.

FIG. 2 is a flowchart of an example process 200 for identifying an alternative query. The process 200 can be performed by an appropriately programmed system of one or more computers, e.g., the search system 106. For ease of presentation, the process 200 will be described with reference to a search system, e.g. search system 106 of FIG. 1.

The process 200 begins when the search system receives a first query (202). For example, the search system 106 can receive a query from a user device, e.g., the user device 102. The query can include one or more query terms.

The search system then obtains a first set of resources that are responsive to the query (204). For example, the search engine 110 can receive a query and obtain a first set of resources that are responsive to the query. Each resource is located on a respective site and has a respective ranking score.

The search system determines whether the first set of resources includes at least a predetermined number N, e.g. 10, 50, 100, of top-ranked resources from low-quality sites (206). For example, the search system can compare sites on which the top-ranked resources are located to a list of sites that had been previously identified as being low-quality sites.

What constitutes a site can be defined operationally in a number of ways by a search system. For example, a search system can define a site as a collection of resources that are hosted on a particular server. Alternatively or in addition, a search system can define a site as the resources in a domain, e.g., "example.com," where the resources in the domain, e.g., "host.example.com/resource1," "www.example.com/folder/resource2," or "example.com/resource3," are in the site. In addition, a search system can define a site as the resources in a subdomain, e.g., "en.example.com," where the resources in the subdomain, e.g., "en.example.com/resource1" or "en.example.com/folder/resource2," are in the site. Alternatively or in addition, a search system can define a site as the resources in a subdirectory, e.g., "example.com/subdirectory," where the resources in the subdirectory, e.g., "example.com/subdirectory/resource.html," are in the site.

The search system can assign or access a site quality score for a particular site. The system can use the site quality score to classify the particular site as a low-quality site, a high-quality site, or neither. For example, the system can compare the site quality score to one or more thresholds to determine whether the particular site is a low-quality site or a high-quality site. Alternatively, the system can use a white list of high-quality sites and a black list of low-quality sites prepared manually or by some other method offline.

If the set of resources includes at least N top-ranked resources from low-quality sites, the search system identifies an alternative query (branch to 210). For example, the alternative query module 112 can determine whether some number of the top-ranked resources, e.g., the 3, 5, 10, or 20, highest-ranked resources, responsive to the first query include at least a predetermined number N of resources from sites that have been previously identified as low-quality sites. The predetermined number N can be a number of resources, e.g., 3, 5, 8, or 10, or a percentage of the top-ranked resources, e.g., 30%, 50%, 80%, or 90% of the top-ranked resources. If the set of resources does not include at least N top-ranked resources from low-quality sites, the search system provides search results that identify the first set of resources in a response to the first query, e.g. to a user device that submitted the first query (branch to 208).

Otherwise, the search system obtains an alternative query (210) and obtains a second set of resources that are responsive to the alternative query (212). The second set of resources obtained for the alternative query are candidate resources that can be added to or blended into a set of resources that will be provided in response to the first query. Each of the resources in the second set of resources are likewise located on a respective site and are associated with a respective ranking score.

The search system can also obtain multiple alternative queries and obtain multiple secondary result sets that are responsive to each of the multiple alternative queries. Resources in any of the obtained secondary result sets are candidate resources can be added to or blended into the set of resources that will be provided in response to the first query. Identification of alternative queries will be described in more detail below with reference with FIG. 4.

The search system can optionally evaluate the alternative query using one or more additional criteria (214). If the alternative query does not meet the one or more additional criteria, the search system can provide the first set of resources (branch to 208) or alternatively identify a different alternative query (branch to 210).

For example, the alternative query module 112 can evaluate an alternative query by analyzing the second set of resources to determine whether the second set of resources includes at least a number M of top-ranked resources from high-quality sites. For example, the alternative query module 112 can compare the sites on which the top-ranked resources are located to a list of sites that have been previously identified as being high-quality sites. The predetermined number M can be any value, for example, 1, 50, or 500, and can vary depending on system capabilities or user preferences. In some implementations, M can be one if a resource associated with the high-quality site is the top-ranked resource in the second set of resources. In addition or alternatively, the search system can evaluate the alternative query by comparing the second set of resources to the first set of resources to determine whether the second set of resources includes at least a predetermined number X of resources in common with a number of top-ranked resources in the first set of resources. The predetermined number X can be a percentage, such as, e.g., 30%, 40%, or 50%.

The search system calculates a scaling factor (216). For example, the alternative query module 114 can calculate a scaling factor based on the ranking score associated with the top-ranked resource in the first set of resources and the ranking score associated with the highest-ranked resource in a second set of resources that is located on a high-quality site. In some example implementations, the scaling factor is given by:

$$\text{Scaling\_factor} = \frac{R_0 + 1}{R_1},$$

where $R_0$ represents the ranking score associated with the top-ranked resource in the first set of resources and $R_1$ represents the ranking score associated with the top-ranked resource in a second set of resources that is located on a high-quality site. The scaling factor can be calculated using other factors and formulas.

The search system scales the ranking scores associated with resources in a second set of resources that are located on high-quality sites (218). For example, the alternative query module 114 can multiply the ranking scores associated with the resources included in the second set of resources that are located on high-quality sites by the Scaling_factor.

The search system then merges the first set of resources with resources from the second set of resources located on high-quality sites and ranks the merged resources according to the ranking scores associated with the resources (218). If the search system has obtained multiple alternative queries and multiple secondary result sets, the search system can merge all resources from the first set of resources and the resources from the secondary result sets. After the resources have been combined and ranked, a number of top-ranked resources included in the merged resources will generally include one or more resources from high-quality sites. In implementations where the scores are scaled with the Scaling_factor as described above, the top-ranked resources in the merged resources will generally include one or more resources from a high-quality site.

The search system provides the search results identifying the merged resources to the user device (222). For example, the search system 106 can generate search results based on the merged resources such that the top-ranked search results include resources from high-quality sites and provide the search results to the user device 102. The user device 102 displays the search results on a search engine results page.

FIG. 3 illustrates examples of search results 300. The example search results 300 include first search results 302 that identify a first set of resources, second search results 304 that identify a second set of resources, and merged search results 306 that are identify a merged set of resources.

The first search results 302 are search results that identify a first set of resources that the search system obtains in response to a first query. For example, the first search results 302 can be search results that identify the resources described above with reference to FIG. 2. The top-ranked search results included in the first search results 302 identify at least N resources located on sites that have been identified as low-quality sites. For example, the top three search results included in the first search results 302, e.g., search results 302a-302c, identify resources located on low-quality sites.

The resource associated with the search result 302a, the top-ranked search result in the first search results 302, is associated with a ranking score $R_0$.

The second search results 304 are search results that identify the second set of resources that the search system obtains in response to an alternative query. For example, the second search results 304 can be search results that identify the resources described above with reference to 212. The second search results 304 identify resources that are also identified in the first search results 302, e.g., search result 304b. The top-ranked search results included in the second search results 304 identify resources located on high-quality sites. For example, the top three search results identified in the second search results 304, e.g., search results 304a-304c, include resources located on high-quality sites, e.g., the search result 304a and 304c. The resource associated with the search result 304a, the top-ranked search result in the second search results 304, is associated with a ranking score $R_1$.

The merged search results 306 are search results that identify the merged resources, as described above with reference to FIG. 2. The top-ranked search results included in the merged search results 306 include search results that identify resources located on high-quality sites and resources located on low-quality sites. For example, the top-ranked search result 306a identifies a resource located on a high-quality site and the second highest-ranked search result 306b identifies a resource located on a low-quality site. The search system can compute a scaled ranking score for those search results 304 that are located on high-quality sites, for example, search result 306a. The search system can compute the scaled ranking score by multiplying the ranking score for search result 306a, $R_1$, by the Scaling_factor.

The presentation of the merged search results 306 on the search engine results page can include an indication that some of the results were obtained in response to one or more alternative queries. For example, the search engine results pages can include an indication of the query from which each search result was obtained. Alternatively, the presentation of search results can omit such information so that the search results presented on the search engine results page will appear to a user to have been obtained only for the first query.

Figure 4:
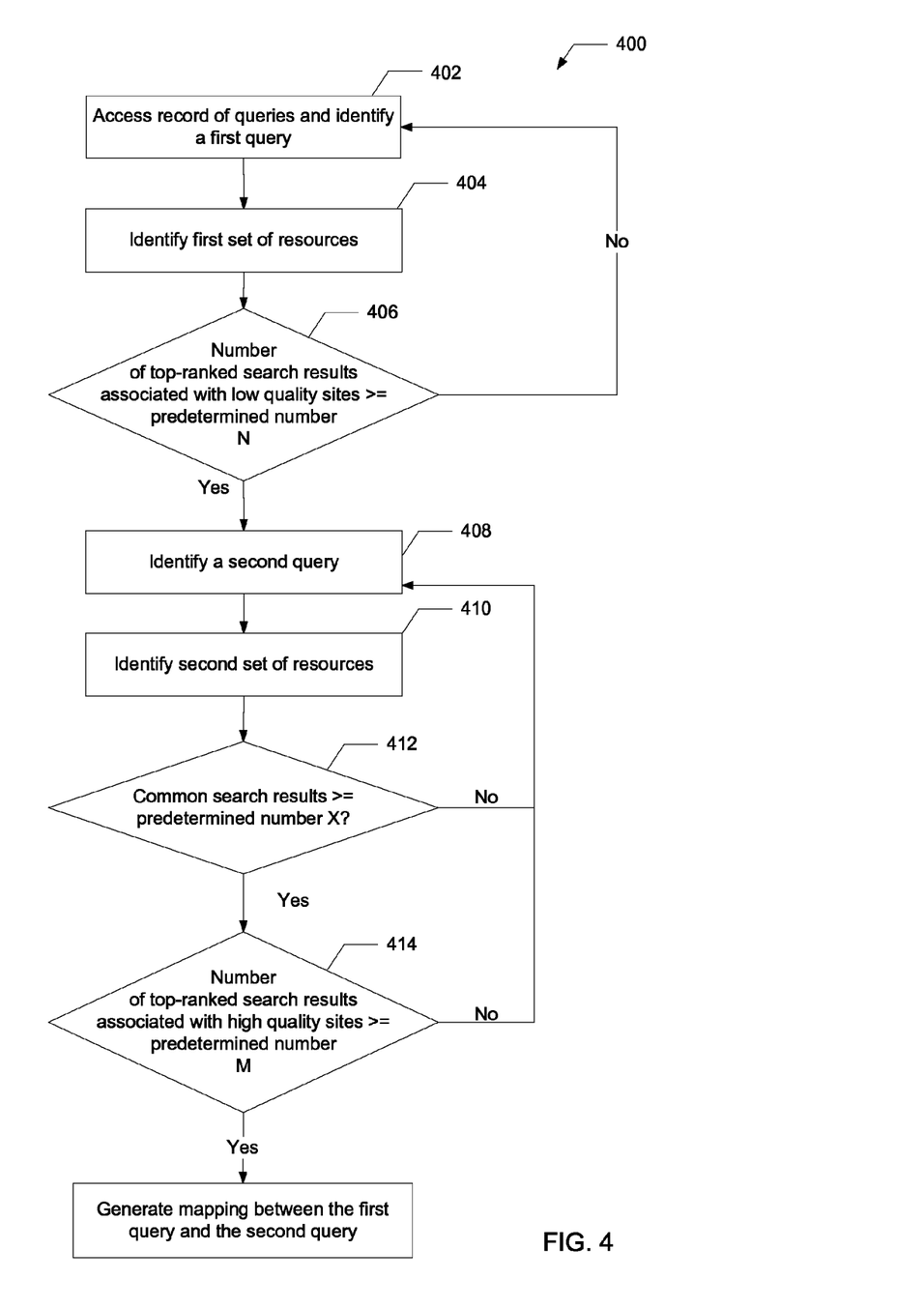
FIG. 4 is a flowchart of an example process for identifying an alternative query.

FIG. 4 is a flowchart of an example process 400 for identifying an alternative query. The process 400 can be performed by a system of one or more appropriately programmed computers, e.g., the search system 106. For ease of discussion, the process 400 will be described with reference to the search system 106 of FIG. 1.

The search system accesses a record of queries and selects a first query (402). The record of queries can include information about queries received by the search system over a period of time, e.g., an hour, several hours, a day, or some other period of time. The record of queries can be periodically generated and may include data from one or more query logs or other sources of information. The search system identifies a first set of resources that are responsive to the first query (404). For example, the search engine 110 can identify resources that are responsive to the query.

The search system determines whether the set of resources includes at least a predetermined number N of top-ranked resources that are located on low-quality sites (406). If the set of resources does not include at least N top-ranked resources that are located on low-quality sites, the search system 106 accesses the record of queries and identifies a new query (branch to 402).

If the set of resources includes at least N top-ranked resources that are located on low-quality sites, the search system obtains a second query (branch to 408). Various techniques can be used to obtain a second query. For example, the system can access a database that includes substitute query terms and can generate an alternative query by substituting a substitute query term for one of the query terms in the first query. In some implementations, the search system requires that the second query include at least one common query term with first query.

The search system can also build a conceptual graph of queries and traverse the graph to obtain one or more alternative queries. Each node in the graph is defined by a query and a set of top-ranked search results obtained for the query. Links between nodes in the graph can indicate that the queries are related or that one query is an alternative query for another query.

The search system can add links between nodes in the graph if two result sets satisfy certain criteria. For example, the system can add links between nodes if the result sets of the nodes include at least a threshold number of search results in common. The system can also require one or both of the result sets to include at least a threshold number of high-quality sites before adding a link between nodes in the graph. Other linking criteria can also be used.

To obtain an alternative query, the search system can start at a node in the graph corresponding to the first query. The system can then traverse links in the graph to other nodes that correspond to candidate alternative queries for the first query. The search system can for example, traverse the graph to a first node corresponding to a first alternative query, and then traverse the graph again from the first node to a second node corresponding to a second alternative query. The search system may still consider the second alternative query as an alternative for the first query even though no link in the graph exists between the node for the first query and the node for the second alternative query. In other words, the system need not stop the graph traversal at nodes linked directly to the first query's node.

The search system can evaluate multiple candidate alternative queries according to a measure of confidence and can then select an alternative query having a highest measure of confidence. The measure of confidence can be based on a variety of factors. For example, the search system can compare the set of resources associated with a candidate alternative query to the first set of resources to determine a number of resources that the result sets have in common. The search system can also consider the number of resources associated with a candidate alternative search result that are located on high-quality sites. The search system can also compute a measure of similarity between terms of the first query and a candidate alternative query. The measure of confidence can also be based on other factors.

In some implementations, the system can require that the set of resources associated with a candidate alternative query includes at least a predetermined number X of resources in common with the first set of resources (412). If the second set of resources does not include at least X resources in common with the first set of resources, the search system can obtain a different second query (branch to 408).

In some implementations, the search system can require the set of resources associated with an alternative query to include at least a predetermined number M of top-ranked resources that are located on high-quality sites (414). For example, the system can compare the sites on which the set of resources were located to a list of sites that had been previously identified as being a high-quality site. In some implementations, the search system uses the same value for M and N.

If the second set of resources does not include at least M top-ranked resources that are located on high-quality sites, the search system can obtain other alternative queries (branch to 408). If the second set of resources includes at least M top-ranked resources that are located on high-quality sites, the search system can generate a mapping between the first query and the alternative query. For example, the system can create a new entry in the alternative query mapping database 114 that represents a mapping from the first query to the alternative query. The search system can repeat the process 400 until all the queries in the record of queries have been analyzed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the disclosed subject matter or of what may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a first query;
   receiving, from a search engine, data identifying first search results that the search engine identifies as responsive to the first query, wherein each of the first search results has a respective ranking score;
   determining that at least a first threshold number N of top-ranked first search results reference resources that are located on sites that are previously identified as low-quality sites;
   in response to determining that at least the first threshold number N of top-ranked first search results reference resources that are located on sites that are previously identified as low-quality sites, obtaining a second query from a predetermined mapping of queries to alternative queries;
   receiving, from the search engine, data identifying second search results that the search engine identifies as responsive to the second query, wherein each of the second search results has a respective ranking score;
   determining that at least a second threshold number M of top-ranked second search results reference resources that are located on sites that are previously identified as high-quality sites; and
   in response to determining that at least the second threshold number M of top-ranked second search results reference resources that are located on sites that are previously identified as high-quality sites, providing one or more of the second search results in response to the first query.

2. The method of claim 1, further comprising determining that in the predetermined mapping of queries to alternative queries, the first query is mapped to the second query.

3. The method of claim 1, wherein the number N is a predetermined number of search results or a predetermined percentage of search results.

4. The method of claim 1, further comprising selecting one of the second search results from one or more search results located on high-quality sites of the M top-ranked second search results reference resources.

5. The method of claim 4, further comprising:
   determining that the top-ranked second search results reference resource in the second search results is located on a high-quality site; and
   selecting the top-ranked second search results reference resource in the second search results as one of the second search results.

6. The method of claim 5, wherein providing the search results in response to the first query comprises:
   computing a scaling factor given by a function of a first ranking score associated with a top-ranked second search results reference resource in the first search results and a second ranking score associated with one of the second search results reference resource;
   computing a scaled ranking score associated with the second search results reference resource by multiplying an initial ranking score associated with the second search results reference resource by the scaling factor; and
   ranking the search results and a search result corresponding to the particular second search results reference resource based on the ranking scores associated with the one or more first search results and the scaled ranking score associated with the particular second search results.

7. The method of claim 6 wherein the scaling factor is given by $(R_1+1)/R_2$, wherein $R_1$ represents a first ranking score for a top-ranked first search results reference resource of the first search results and $R_2$ represents a second ranking score for a top-ranked second search results reference of the second search results.

8. A system comprising:
receiving a first query;
receiving, from a search engine, data identifying first search results that the search engine identifies as responsive to the first query, wherein each of the first search results has a respective ranking score;
determining that at least a first threshold number N of top-ranked first search reference resources that are located on sites that are previously identified as low-quality sites;
in response to determining that at least the first threshold number N of top-ranked first search results reference resources that are located on sites that are previously identified as low-quality sites, obtaining a second query from a predetermined mapping of queries to alternative queries;
receiving, from the search engine, data identifying second search results that the search engine identifies as responsive to the second query, wherein each of the second search results has a respective ranking score;
determining that at least a second threshold number M of top-ranked second search results reference resources that are located on sites that are previously identified as high-quality sites; and
in response to determining that at least the second threshold number M of top-ranked second search results reference resources that are located on sites that are previously identified as high-quality sites, providing one or more of the second search results in response to the first query.

9. The system of claim 8, wherein obtaining the second query comprises identifying a query and M top-ranked second search results reference resources that are responsive to the query and that have at least a third threshold number of second search results in common with the N top-ranked first search results reference resources.

10. The system of claim 8, wherein the operations further comprise:
determining that in the predetermined mapping of queries to alternative queries, the first query is mapped to the second query.

11. The system of claim 8, wherein the number N is a predetermined number of search results or a predetermined percentage of search results.

12. The system of claim 8, further comprising selecting one of the second search results from one or more search results located on high-quality sites of the M top-ranked second search results reference resources.

13. The system of claim 12, wherein the operations further comprise:
determining that the top-ranked second search results reference resource in the second search results is located on a high-quality site; and
selecting the top-ranked second search results reference resource in the second search results as one of the second search results.

14. The system of claim 13, wherein providing the search results in response to the first query comprises:
computing a scaling factor given by a function of a first ranking score associated with a top-ranked first search results reference resource in the first search result and a second ranking score associated with one of the second search results;
computing a scaled ranking score associated with the particular second search result by multiplying an initial ranking score associated with the second search result by the scaling factor; and
ranking the search results and a search result corresponding to the second search results reference resource based on the ranking scores associated with the one or more first search results and the scaled ranking score associated with the particular second search result.

15. The system of claim 14 wherein the scaling factor is given by $(R_1+1)/R_2$, wherein $R_1$ represents a first ranking score for a top-ranked first search results reference resource of the first search results and $R_2$ represents a second ranking score for a top-ranked second search results reference resources of the second search results resources.

16. The method of claim 1, further comprising generating the mapping of queries to alternative queries, wherein generating the mapping comprises:
accessing a record of queries and obtaining a record query from the record of queries;
identifying a set of search results responsive to the record query;
determining that the set of search results includes more than a threshold number of search results located on sites previously identified as low-quality sites;
generating a plurality of candidate queries, including, for each candidate query, (i) generating the candidate query by accessing a database of substitute query terms and generating the candidate query by substituting a substitute query term for one of the query terms in the record query, or (ii) generating the candidate query by building a conceptual graph of queries and traversing the graph to obtain the candidate query; and
evaluating the plurality of candidate queries according to a measure of confidence, selecting one or more candidate query having a highest measure of confidence as the alternative query, and mapping the record query to the one or more candidate queries as alternatives to the record query.

17. The system of claim 8, wherein the operations further comprise generating the mapping of queries to alternative queries, wherein generating the mapping comprises:
accessing a record of queries and obtaining a record query from the record of queries;
identifying a set of search results to the record query;
determining that the set of search results includes more than a threshold number of search results located on sites previously identified as low-quality sites;
generating a plurality of candidate queries, including, for each candidate query, (i) generating the candidate query by accessing a database of substitute query terms and generating the candidate query by substituting a substitute query term for one of the query terms in the record query, or (ii) generating the candidate query by building a conceptual graph of queries and traversing the graph to obtain the candidate query; and
evaluating the plurality of candidate queries according to a measure of confidence, selecting one or more candidate query having a highest measure of confidence as the alternative query, and mapping the record query to the one or more candidate queries as alternatives to the record query.

18. A computer program product, encoded on one or more non-transitory computer storage media, comprising instructions that when executed by one or more computers cause the one or more computers to perform operations comprising:

receiving a first query;

receiving, from a search engine, data identifying first search results that the search engine identifies as responsive to the first query, wherein each of the first search results has a respective ranking score;

determining that at least a first threshold number N of top-ranked first search reference resources that are located on sites that are previously identified as low-quality sites;

in response to determining that at least the first threshold number N of top-ranked first search results reference resources that are located on sites that are previously identified as low-quality sites, obtaining a second query from a predetermined mapping of queries to alternative queries;

receiving, from the search engine, data identifying second search results that the search engine identifies as responsive to the second query, wherein each of the second search results has a respective ranking score;

determining that at least a second threshold number M of top-ranked second search results reference resources that are located on sites that are previously identified as high-quality sites; and in response to determining that at least the second threshold number M of top-ranked second search results reference resources that are located on sites that are previously identified as high-quality sites, providing one or more of the second search results in response to the first query.

* * * * *